United States Patent

Bouda

(10) Patent No.: US 8,571,419 B2
(45) Date of Patent: Oct. 29, 2013

(54) METHOD AND SYSTEM FOR FLEXIBLE OPTICAL SIGNAL AGGREGATION AND TRANSMISSION

(75) Inventor: Martin Bouda, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 106 days.

(21) Appl. No.: 13/224,114

(22) Filed: Sep. 1, 2011

(65) Prior Publication Data

US 2013/0058650 A1 Mar. 7, 2013

(51) Int. Cl.
*H04B 10/04* (2011.01)
*H04B 10/12* (2011.01)
*H04J 14/02* (2006.01)

(52) U.S. Cl.
USPC ............................................ 398/196; 95/143

(58) Field of Classification Search
None
See application file for complete search history.

(56) References Cited

U.S. PATENT DOCUMENTS

| | | | | |
|---|---|---|---|---|
| 4,783,850 A | * | 11/1988 | MacDonald et al. | 398/48 |
| 5,548,434 A | * | 8/1996 | Shimonaka et al. | 398/162 |
| 6,118,565 A | * | 9/2000 | Frigo | 398/68 |
| 2007/0154221 A1 | * | 7/2007 | McNicol et al. | 398/135 |
| 2012/0251101 A1 | * | 10/2012 | McNicol et al. | 398/25 |

OTHER PUBLICATIONS

Senichi Suzuki et al., Integrated Multichannel Optical Wavelength Selective Switches Incorporating an Arrayed-Waveguide Grating Multiplexer and Thermooptic Switches, Apr. 1998, IEEE, Journal of Lightwave Technology, vol. 16, No. 4, pp. 650-655.*

* cited by examiner

*Primary Examiner* — Kenneth N Vanderpuye
*Assistant Examiner* — Jai Lee
(74) *Attorney, Agent, or Firm* — Baker Botts L.L.P.

(57) ABSTRACT

In accordance with some embodiments of the present disclosure, a method for spectrally spacing carrier waves comprises determining a frequency offset between a first frequency of a first optical carrier wave and a second frequency of a second optical carrier wave. The method further comprises adjusting the second frequency of the second optical carrier wave according to the frequency offset. The method additionally comprises combining a first optical signal associated with the first carrier wave and a second optical signal associated with he second carrier wave into a multi-frequency signal.

16 Claims, 6 Drawing Sheets

US 8,571,419 B2

METHOD AND SYSTEM FOR FLEXIBLE OPTICAL SIGNAL AGGREGATION AND TRANSMISSION

TECHNICAL FIELD

The present disclosure relates generally to optical networks, more particularly, to a system and method for optical signal aggregation and transmission.

BACKGROUND

Telecommunications systems, cable television systems and data communication networks use optical networks to rapidly convey large amounts of information between remote points. In an optical network, information ("traffic") is conveyed in the form of optical signals through optical fibers.

To satisfy the ever increasing demand of conveying information through optical networks, the spectral efficiency of optical networks may need to be increased. The spectral efficiency may refer to the amount of information that may be transmitted within the optical spectrum of the optical network and may be represented by bits per Hertz (bits/Hz). Spectral efficiency may be increased by using transmission media that may support a higher capacity of information modulated onto a wavelength.

However, the increased capacity may also increase the number of connections used to add information to or drop information from the network. The increased number of connections may commonly require regeneration of the optical signal to add or drop information within the network, thus causing inefficiencies.

SUMMARY

In accordance with some embodiments of the present disclosure, a method for spectrally spacing carrier waves comprises determining a frequency offset between a first frequency of a first optical carrier wave and a second frequency of a second optical carrier wave. The method further comprises adjusting the second frequency of the second optical carrier wave according to the frequency offset. The method additionally comprises combining a first optical signal associated with the first carrier wave and a second optical signal associated with he second carrier wave into a multi-frequency signal.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
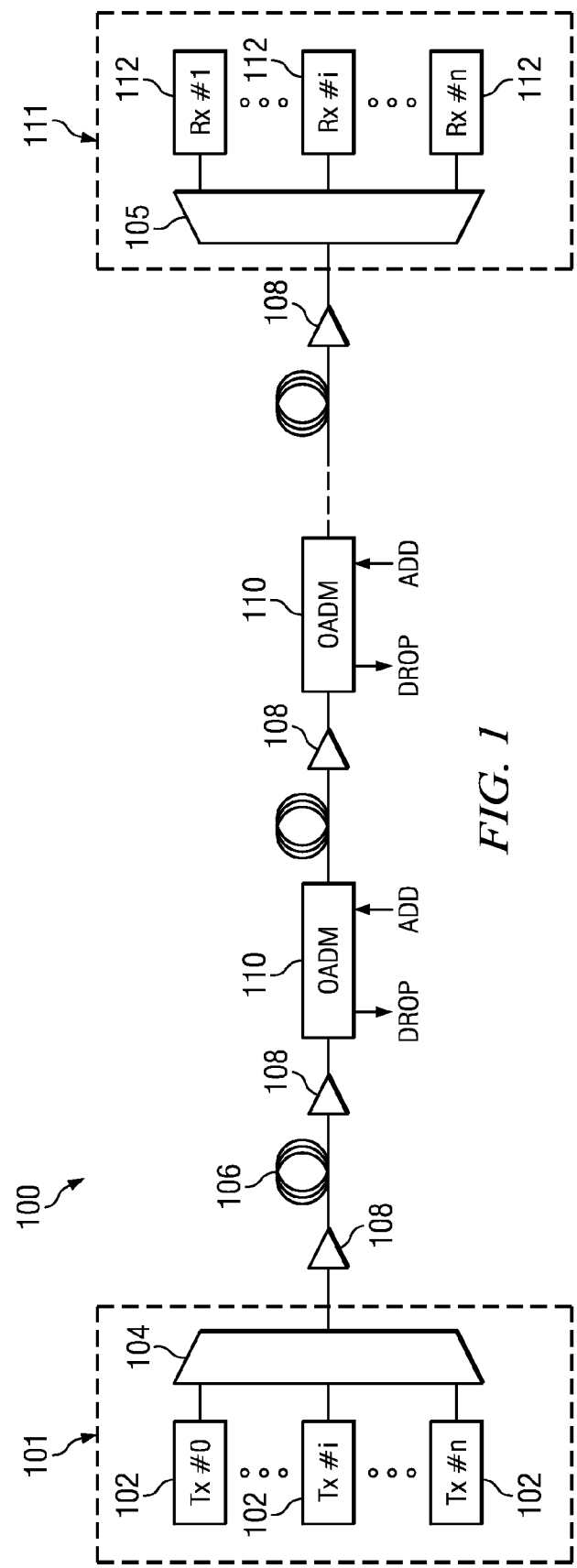
FIG. 1 illustrates an example embodiment of an optical network.

FIG. 1 illustrates an example embodiment of an optical network 100. Optical network 100 may include one or more optical fibers 106 configured to transport one or more optical signals communicated by components of optical network 100. The network elements of optical network 100, coupled together by fibers 106, may comprise one or more transmitters 102, one or more multiplexers (MUX) 104, one or more demultiplexers (DEMUX) 105, one or more amplifiers 108, one or more optical add/drop multiplexers (OADM) 110, and one or more receivers 112. In the present embodiment, transmitters 102 and multiplexer 104 may be included in a transmitting node 101 of network 100. Additionally, receivers 112 and demultiplexer 105 may be included in a receiving node 111 of network 100. Alternatively, 104 and 105 may be any kind of device that may combine and/or distribute optical signals, including optical couplers.

Optical network 100 may comprise a point-to-point optical network with terminal nodes, a ring optical network, a mesh optical network, or any other suitable optical network or combination of optical networks. Optical fibers 106 comprise thin strands of glass capable of communicating optical signals over long distances with very low loss. Optical fibers 106 may comprise any suitable type of fiber, such as a Single-Mode Fiber (SMF), Enhanced Large Effective Area Fiber (ELEAF), or a TrueWave® Reduced Slope (TW-RS) fiber.

Optical network 100 may include devices configured to transmit optical signals over fibers 106. Information (also referred to as "traffic") may be transmitted and received through network 100 by modulation of one or more wavelengths of light to encode the information on the wavelength. In optical networking, each wavelength of light configured to carry information may be referred to as a carrier wavelength or carrier wave. Additionally, the frequency of a carrier wavelength may be referred to as a carrier frequency. The carrier waves may correspond with an optical channel. The term "channel" may refer to a range of wavelengths within the optical spectrum of an optical network.

To increase the information carrying capabilities of optical network 100, multiple signals transmitted at multiple wavelengths may be combined into a single optical signal. The process of communicating information at multiple wavelengths of a single optical signal is referred to in optics as wavelength division multiplexing (WDM). Dense wavelength division multiplexing (DWDM) refers to the multiplexing of a larger (denser) number of wavelengths in a fixed spectral slice, usually greater than forty, into a fiber. WDM, DWDM, or other multi-wavelength transmission techniques are employed in optical networks to increase the aggregate bandwidth per optical fiber. Without WDM or DWDM, the bandwidth in optical networks may be limited to the bit-rate of solely one wavelength. With more bandwidth, optical networks are capable of transmitting greater amounts of information. Optical network 100 may be configured to transmit disparate wavelengths using WDM, DWDM, or some other suitable multi-wavelength multiplexing technique, and to amplify the multi-wavelength signal.

Network 100 may be configured such that the spacing between carrier waves may be based on the relative spectral distance between the carrier waves and not based on fixed optical channel spacing or system wavelength grids, as is done in conventional optical networks. Spacing carrier waves based on the relative spectral distance between the carrier waves instead of fixed channel spacing or wavelength grids may provide a more accurate spacing between carrier waves, which may allow for closer spacing. The closer spacing may consequently increase spectral efficiency. More accurate spacing also may enable more effective impairment mitigation related to crosstalk effects between optical wavelengths.

For example, in a conventional, fixed channel spacing grid, the spacing between carrier wavelengths may be established such that if one of the carrier waves drifts from its desired frequency, it will not interfere with an adjacent wavelength of an adjacent channel. However, in a system where the spacing between carrier waves is based on the relative spectral spacing between carrier waves (as in the present embodiment), if a carrier wave drifts from its desired frequency, the frequencies of the other carrier waves may also be shifted such that the spectral spacing between the carrier waves is maintained. Therefore, spectral spacing buffers of traditional systems that may be needed to allow for wavelength drift may be reduced or eliminated when relative spectral spacing is used. Another example of increasing spectral efficiency is the generation of super-channels by adding wavelengths in close proximity to an existing optical signal arriving from another network node.

Additionally, the more accurate relative spacing between carrier waves may allow for one or more carrier waves to correspond with a channel of network 100, whereas in conventional optical networks, one carrier wave may typically correspond with one channel. With multiple carrier waves corresponding to a single channel, traffic flows of a channel may be accessed without converting the entire optical signal of the channel from an optical signal to an electrical signal, electronically adding and dropping traffic and then converting the electrical signal back to an optical signal. Thus, the speed and efficiency of network 100 may be increased over traditional optical networks that may require conversion and regeneration of the entire channel for adding and dropping traffic. Optical network 100 may include a transmitting node 101 that includes one or more optical transmitters (Tx) 102 configured to transmit optical signals through optical network 100 at specific wavelengths (e.g., transmitters 102 may generate carrier waves). Transmitters 102 may comprise any system, apparatus or device configured to convert an electrical signal into an optical signal and transmit the optical signal. For example, transmitters 102 may each comprise a laser and a modulator configured to receive electrical signals and modulate the information contained in the electrical signals onto a beam of light produced by the laser at a particular wavelength and transmit the beam carrying the signal throughout the network. Accordingly, transmitters 102 may transmit the carrier waves of network 100. As described in further detail below, transmitters 102 may be configured such that the spacing between the carrier waves generated by transmitters 102 is based on a relative spectral distance between carrier waves.

Transmitting node 101 may also include multiplexer 104 coupled to transmitters 102. Multiplexer 104 may be any system, apparatus or device configured to combine the signals transmitted by transmitters 102, in individual wavelengths, into a single WDM or DWDM signal comprising a plurality of wavelengths or carrier waves.

Amplifiers 108 may amplify the multi-channeled signals within network 100. Amplifiers 108 may be positioned before and/or after certain lengths of fiber 106. Amplifiers 108 may comprise any system, apparatus, or device configured to amplify signals. For example, amplifiers 108 may comprise an optical repeater that amplifies the optical signal. This amplification may be performed without opto-electrical or electro-optical conversion. In some embodiments, amplifiers 108 may comprise an optical fiber doped with a rare-earth element. When a signal passes through the fiber, external energy may be applied to excite the atoms of the doped portion of the optical fiber, which increases the intensity of the optical signal. As an example, Amplifiers 108 may comprise an erbium-doped fiber amplifier (EDFA). However, any other suitable amplifier, such as a semiconductor optical amplifier (SOA), may be used.

OADMs 110 may be coupled to network 100 via fibers 106. OADMs 110 may comprise an add/drop module, which may include any system, apparatus or device configured to add and/or drop optical signals from fibers 106. After passing through an OADM 110, a signal may travel along fibers 106 directly to a destination, or the signal may be passed through one or more additional OADMs 110 before reaching a destination. As discussed in further detail, OADMs 110 may also be configured such that traffic may be added to or dropped from network 100 based on optically adding or dropping carrier waves with relative spectral spacing between each other. OADMs 110 may also be reconfigurable add-drop modules (ROADMs) or any other kind of add and/or drop nodes without departing from the scope of the present disclosure.

Network 100 may also include one or more receiving nodes 111 that include a demultiplexer 105 and one or more receivers 112. Receiving node 111 may comprise a destination of network 100. Demultiplexer 105 may comprise any system apparatus or device that may act as a demultiplexer by splitting a single WDM signal into its individual wavelengths or carrier waves. In some embodiments, demultiplexer 105 may comprise a multiplexer 104 but configured to split WDM signals into their individual wavelengths instead of being configured to combine individual carrier wavelengths into one WDM signal. For example, network 100 may transmit and carry a forty wavelength DWDM signal. Demultiplexer 105 may divide the single, forty wavelength DWDM signal into forty separate signals according to the forty different wavelengths. The demultiplexer 105 may also forward copies of a DWDM signal to all outputs, or forward copies of part of the DWDM spectrum to appropriate outputs. In addition, demultiplexer 105 may be reconfigurable to forward desired parts of the DWDM signal to suitable outputs as needed.

Receiving node 111 may also include receivers 112 coupled to demultiplexer 105. Each receiver 112 may be configured to receive signals transmitted in a particular carrier wavelength, and process the signals for the information that they contain. Accordingly, network 100 may include at least one receiver 112 for every carrier wave of the network. As described in further detail below, each receiver 112 may be configured to receive a signal transmitted at a particular carrier wavelength with a relative spectral spacing based on another carrier wavelength. Additionally, each receiver 112 may be configured to compensate for negative effects experienced by a signal as its associated carrier wave propagates through network 100 (e.g., crosstalk between carrier waves, cross phase modulation, dispersion, polarization mode dispersion (PMD), etc.). Receivers 112 may also be configured to receive multiple carrier wavelengths.

Receiving node 111 may also be combined with an OADM node, receiving drop traffic from the OADM node. Transmitting node 101 may also be combined with an OADM node, transmitting traffic to one or more add ports of the OADM.

Modifications, additions or omissions may be made to network 100 without departing from the scope of the disclosure. For example, network 100 may include more or fewer elements than those depicted. Additionally network 100 may include additional elements not expressly shown, such as a dispersion control module. Also, as mentioned above, although depicted as a point to point network, network 100 may comprise any suitable network for transmitting optical signals such as a ring or mesh network. Amplifiers may be placed in any other suitable place in the optical paths.

Figure 2:
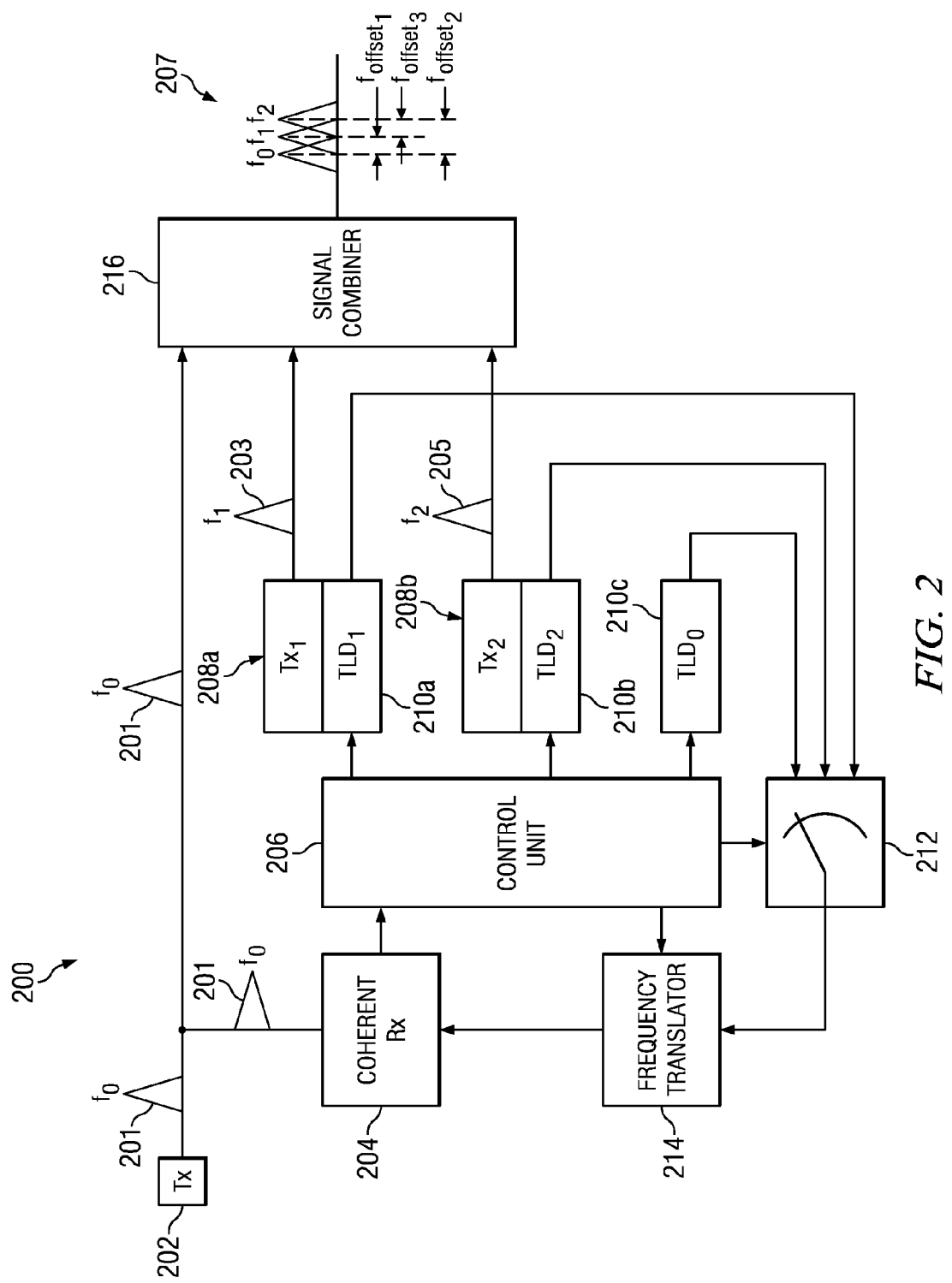
FIG. 2 illustrates an example system configured to space carrier waves based on the relative spectral distance between the carrier waves.

FIG. 2 illustrates an example system 200 configured to space carrier waves based on the relative spectral distance between the carrier waves. System 200 may be implemented in any suitable node of an optical network, such as network 100, where carrier waves are added to the network. For example, system 200 may be implemented in a transmitting node 101 or an OADM 110 of network 100.

System 200 may include a reference transmitter 202 configured to generate a reference optical signal 201 that comprises a carrier wave having a reference frequency ($f_0$). In some embodiments of the present disclosure, the carrier wave of reference signal 201 may also include information or traffic modulated thereon. In alternative embodiments, the carrier wave may not have traffic modulated thereon. System 200 may also include one or more tunable transmitters 208 configured to generate signals with carrier waves whose frequencies may be based on a relative spectral distance from the frequency of the reference wave. Reference transmitter 202 may be located in any suitable location of the optical network associated with system 200. System 200 may also include one or more control units 206 configured to analyze the spectral spacing determined by coherent receiver 204 and configured to tune tunable transmitters 208 based on the spectral spacing measured by coherent receiver 204. Control unit 206 may also tune a reference laser 210c based on determined spectral spacing.

Further, system 200 may include, one or more switches 212 configured to couple tunable transmitters 208 with coherent receiver 204. Accordingly, switch 212 may enable coherent receiver 204 to receive carrier waves generated by multiple tunable transmitters 208 and determine the spectral spacing between the reference carrier wave and each carrier wave generated by a tunable transmitter 208. In addition, coherent receiver 204 may be provided a wavelength from a laser source (e.g., tunable laser 210c) through the switch 212. System 200 may also include one or more signal combiners 216 configured to combine the carrier waves generated by tunable transmitters 208 with the reference wave. It is understood that system 200 is for illustrative purposes only, and that other systems may include more or fewer components than those shown without departing from the scope of the present disclosure. Further, different types of components than those explicitly shown or listed may be included in a system contemplated by the present disclosure. In addition, the signal combiner may be configured to block the reference signal. The Signal combiner may be any combination of components in a node resulting in combining signals 201, 203 and 205 and any other signals and forwarding these to a fiber coupled to another node.

Tunable transmitters 208a and 208b may be configured to generate optical signals 203 and 205, respectively. Optical signals 203 and 205 may comprise carrier waves having frequencies "f" ($f_1$ and $f_2$ respectively) and which may have traffic modulated thereon. Frequencies $f_1$ and $f_2$ may be based on a relative spectral distance between the carrier waves of signals 203 and 205 and a reference carrier wave of reference signal 201 having a reference frequency $f_0$. As mentioned above, reference signal 201 may be generated by a transmitter 202 included in system 200. In some embodiments of system 200, transmitter 202 may be included in the same node as tunable transmitters 208a and 208b. For example, in transmitting node 101, a transmitter 102 may comprise transmitter 202 and other transmitters 102 may comprise tunable transmitters 208a and 208b. In other embodiments of system 200, transmitter 202 may be included in a different node than tunable transmitters 208a and 208b. For example, in network 100 a transmitter 102 of transmitting node 101 may comprise transmitter 202 and an OADM 110 may include transmitters 208a and 208b.

System 200 may also include a coherent receiver 204. Coherent receiver 204 may comprise any suitable system, apparatus or device configured to determine the difference in frequency (frequency offset) between a received wave and a local oscillator (LO) (e.g., a laser transmitting a wavelength of light at a particular frequency). Additionally, coherent receiver 204 may be configured to receive a signal being carried by a carrier wave having a frequency substantially similar to the local oscillator.

Tunable transmitter 208a may include tunable laser 210a. Tunable laser 210a may comprise any suitable tunable laser and in the present embodiment may comprise a tunable laser diode (TLD). Tunable laser 210a may be configured to generate the carrier wave associated with optical signal 203. Tunable laser 210a may also be coupled to coherent receiver 204 such that at times tunable laser 210a may act as the local oscillator of coherent receiver 204 to provide an optical carrier wave that may be converted into a local oscillator carrier wave for coherent receiver 204. The optical carrier wave may be the carrier wave associated with optical signal 203 and, thus, may have frequency $f_1$. Therefore, coherent receiver 204 may be configured to determine the frequency offset between the reference wave of signal 201 and the carrier wave of signal 203 ($f_{offset1}$) by determining directly or indirectly the frequency offset between $f_0$ of the reference wave of signal 201 and $f_1$ of tunable laser 210a. As described in further detail below, based on the determined frequency offset, transmitter 208a may be tuned such that to $f_{offset1}$ is the desired spectral distance between $f_0$ and $f_1$ ($f_{target1}$).

Similarly, tunable laser 210b of tunable transmitter 208b may be configured to generate the carrier wave of signal 205 and may be configured to act as a local oscillator for coherent receiver 204 at times using the carrier wave of optical signal 205. Accordingly, coherent receiver 204 may also be configured to determine a frequency offset between the reference wave of signal 201 and the carrier wave of signal 205 ($f_{offset2}$). Based on the determined frequency offset, transmitter 208b may be tuned such that $f_{offset2}$ is the desired spectral distance between the reference wave of signal 201 and the carrier wave of signal 205 ($f_{target2}$).

In some embodiments, the same coherent receiver 204 may be configured to determine the offsets between the reference wave of signal 201 and the carrier waves of signals 203 and 205. In alternative embodiments, one coherent receiver may determine the offset between the reference wave of signal 201 and the carrier wave of signal 203 and another coherent receiver 204 may be configured to determine the offset between the reference wave of signal 201 and the carrier wave of signal 205. Additionally, in other embodiments, tunable transmitter 208a may be tuned based on the offset between the reference wave frequency (e.g., $f_0$) and the carrier wave frequency of signal 203 (e.g., $f_1$). In such embodiments, tunable transmitter 208b may be tuned based on the offset between the frequency of the carrier wave of signal 203 (e.g., $f_1$) and the frequency of the carrier wave of signal 205 (e.g., $f_2$). In the same or alternative embodiments, system 200 may include a coherent receiver configured to determine the offset between the reference wave of signal 201 and the carrier wave of signal 205 and may include another coherent receiver configured to determine the offset between the carrier wave of signal 203 and the carrier wave of signal 205 (where the carrier wave of signal 203 may act as the reference wave for determining the frequency of the carrier wave of signal 205).

System 200 may also include tunable laser 210c. Tunable laser 210c may also be configured to act as the local oscillator for coherent receiver 204 at times. Tunable laser 210c may be tuned to approximately the same frequency as the carrier wave of signal 201 (e.g., $f_0$) such that coherent receiver 204 may receive traffic modulated onto reference signal 201. In alternative embodiments, tunable laser 210a or 210b may act as the local oscillator and may be tuned to the frequency of the reference wave of signal 201 for receiving the traffic modulated on reference signal 201.

Switch 212 may be coupled to tunable lasers 210 and coherent receiver 204. In the present embodiment, switch 212 is depicted as being coupled to coherent receiver 204 via frequency translator 214, but in other embodiments system 200 may not include frequency translator 214 and switch 212 may be coupled to coherent receiver 204 without an intervening frequency translator. Switch 212 may be configured to switch between tunable lasers 210a, 210b, and 210c such that one of tunable lasers 210a, 210b, or 210c may be coupled to coherent receiver 204 to act as the local oscillator for coherent receiver 204.

System 200 may also include control unit 206. Control unit 206 may comprise any suitable system, apparatus, or device configured to control the functionality and operations of one or more components of system 200. In the present embodiment, control unit 204 may be coupled to coherent receiver 204, tunable lasers 210, switch 212 and frequency translator 214.

Control unit 206 may be configured to tune tunable lasers 210a and 210b such that the spectral spacing between the reference wave of signal 201 and the carrier waves of signals 203 and 205 is the targeted or desired amount. Control unit 206 may be configured to tune tunable lasers 210a and 210b based on the offset measured by coherent receiver 204.

For example, control unit 206 may be configured to direct switch 212 to switch to tunable laser 210a such that tunable laser 210a is coupled to coherent receiver 204 and acts as the local oscillator for coherent receiver 204. Accordingly, coherent receiver 204 may determine the frequency offset between tunable laser 210a and reference wave 201. Control unit 206 may be coupled to coherent receiver 204 such that control unit 206 receives the frequency offset between tunable laser 210a and reference wave 201 ($f_{offset1}$). Control unit 206 may compare $f_{offset1}$, received from coherent receiver 204, with the desired or targeted offset between tunable laser 210a and reference wave 201 ($f_{target1}$). If $f_{target1}$ is not approximately equal to $f_{offset1}$, control unit 206 may direct tunable laser 210a to change its frequency based on the difference between $f_{target1}$ and $f_{offset1}$. Control unit 206 may continue tuning tunable laser 210a until $f_{offset1}$ is approximately equal to $f_{target1}$. Therefore, control unit 206 may tune tunable laser 210a such that tunable transmitter 208a transmits signal 203 at a frequency $f_1$ that is spectrally spaced from carrier frequency $f_0$ by the desired offset of $f_{target1}$. Additionally, by tuning tunable laser 210a according to the offset between tunable laser 210a and the reference wave of signal 201, the frequency of signal 203 may be based on the relative spectral spacing between the reference wave of signal 201 and the carrier wave of signal 203, and not based on a fixed channel spacing or wavelength grid.

After tuning tunable laser 210a, control unit 206 may direct switch 214 to switch from tunable laser 210a to tunable laser 210b. Accordingly, tunable laser 210b may be coupled to coherent receiver 204 such that tunable laser 210b acts as the local oscillator of coherent receiver 204. Control unit 206 may tune tunable laser 210b in a similar manner as described with respect to tunable laser 210a such that tunable transmitter 208b may transmit signal 205 according to the relative spectral spacing between the reference wave of signal 201 and the carrier wave of signal 205.

In the present embodiment, the desired frequency offset between the reference wave of signal 201 and the carrier wave of signal 205 ($f_{target2}$) may be twice that of $f_{target1}$, such that the frequency offset between the reference wave of signal 201 and the carrier wave of signal 205 ($f_{offset2}$) is approximately twice that of $f_{offset1}$. Accordingly, the offset between the carrier wave of signal 205 and the carrier wave of signal 203 ($f_{offset3}$) may be approximately equal to the offset between the reference wave of signal 201 and the carrier wave of signal 203 ($f_{offset1}$). Further, $f_{offset2}$, and consequently $f_{offset3}$, may be based on the desired relative spectral spacing ($f_{target2}$) between the reference wave of signal 201 and the carrier wave of signal 205.

In alternative embodiments, control unit 206, coherent receiver 204, tunable transmitter 208a, switch 212 and tunable transmitter 208b may be configured such that the frequency of the carrier wave of signal 205 ($f_2$) is based on a desired relative spectral spacing between the carrier wave of signal 205 and the carrier wave of signal 203. In such embodiments, the carrier wave of signal 203 may be configured to act as the reference wave for coherent receiver 204, or another coherent receiver (not shown) when tunable laser 210b is acting as the local oscillator.

In some embodiments system 200 may also include frequency translator 214 coupled between switch 212 and coherent receiver 204. Frequency translator 214 may be configured to shift the frequencies of one or more tunable lasers 210, as the tunable lasers 210 are acting as local oscillators, in instances where the desired channel spacing is much more than tens of MHz. Alternatively the frequency translator 214 may be a multiple frequency generator or frequency comb generator with a predetermined relation to the frequency of a tunable laser connected to it. The frequency comb generator may be configured to create a number of distinct frequencies derived from the optical carrier wave received from a tunable laser 210 before the optical carrier wave is received by coherent receiver 204 from the tunable laser 210. An example of a frequency translator is an optical modulator driven by a single frequency electrical signal.

In some embodiments, the maximum offset that coherent receiver 204 may be able to measure between the reference wave of signal 201 and a local oscillator (e.g., tunable laser 210a or 210b) may be less than the target offset between the reference wave of signal 201 and a carrier wave (e.g., the carrier wave of signal 203 or the carrier wave of signal 205). In such instances, frequency translator 214 may be configured to receive a wave transmitted by a tunable laser acting as a local oscillator and shift the frequency of the wave such that coherent receiver 204 may measure the offset between the shifted wave and the reference wave of signal 201. In such embodiments, control unit 206 may be configured to control the amount of frequency shift performed by frequency translator 214. Additionally, control unit 206 may tune the tunable laser based on the frequency shift performed by frequency translator 214 and the offset calculated by coherent receiver 204 to achieve the target offset associated with the tunable laser.

System 200 may also include a signal combiner 216 configured to receive reference signal 201, optical signal 203 and optical signal 205. As mentioned above, information may be modulated on the carrier waves of at least one of signals 201, 203 and 205. Signal combiner 216 may combine reference signal 201, optical signal 203 and optical signal 205 to be transmitted together through an optical network as a signal 207 comprising at least one of signals 201, 203 and 205. In some instances signal 207 may comprise a WDM signal. Signal combiner 216 may comprise any suitable system, apparatus or device configured to combine a plurality of carrier wavelengths into a signal. As non-limiting examples, in some embodiments signal combiner 216 may comprise a multiplexer such as multiplexer 104 of system 100, in other embodiments, signal combiner 216 may comprise a wavelength selective switch (WSS).

Therefore, system 200 may be configured to generate carrier waves having frequencies based on the frequency of a reference carrier wave. By "locking" the frequencies to each other, the spacing between waves may be reduced, thus increasing the spectral efficiency of an optical network. Additionally, optical channels may include more than one carrier wavelength, thus enabling the addition and removal of traffic from the channel without reconfiguring the signal on the entire channel, thus improving the efficiency of the optical network.

Information modulated on a specific carrier wave in an optical channel may be detected using a coherent receiver tuned appropriately to the specific carrier wave. Removal and addition of individual carrier waves may be realized by appropriate optical filtering of suppression of at least part of the optical spectrum and addition of a new carrier wave with modulated information.

Modifications, additions or omissions may be made to system 200 without departing from the scope of the present disclosure. For example, as described above, in some embodiments system 200 may not include a frequency translator 214 and in other embodiments, system 200 may include a frequency translator 214. Additionally, system 200 may include more coherent receivers 204 than that depicted (e.g., a coherent receiver 204 associated with transmitter 208a and a second coherent receiver 204 associated with transmitter 208b). Further, system 200 may include more or fewer tunable transmitters 208 transmitting at frequencies based on the reference wave of reference signal 201, and consequently, signal 207 may include more or fewer signals with different carrier wavelengths than those explicitly shown. Further, coherent receiver 204 may be connected through a switch to one or more tunable lasers 210 or one or more of modulated signals 203 and 205.

As another example, although separate components are shown and described performing specific operations, it is understood that the functionality of multiple components described may be performed by more or fewer components than those described.

Also, although the terms "reference wave" and "reference signal" are used with respect to signal 201, it is understood that the carrier waves of signals 203 and 205 may also act as "reference waves" with respect to determining the frequency of other waves propagating through the optical network.

Figure 3:
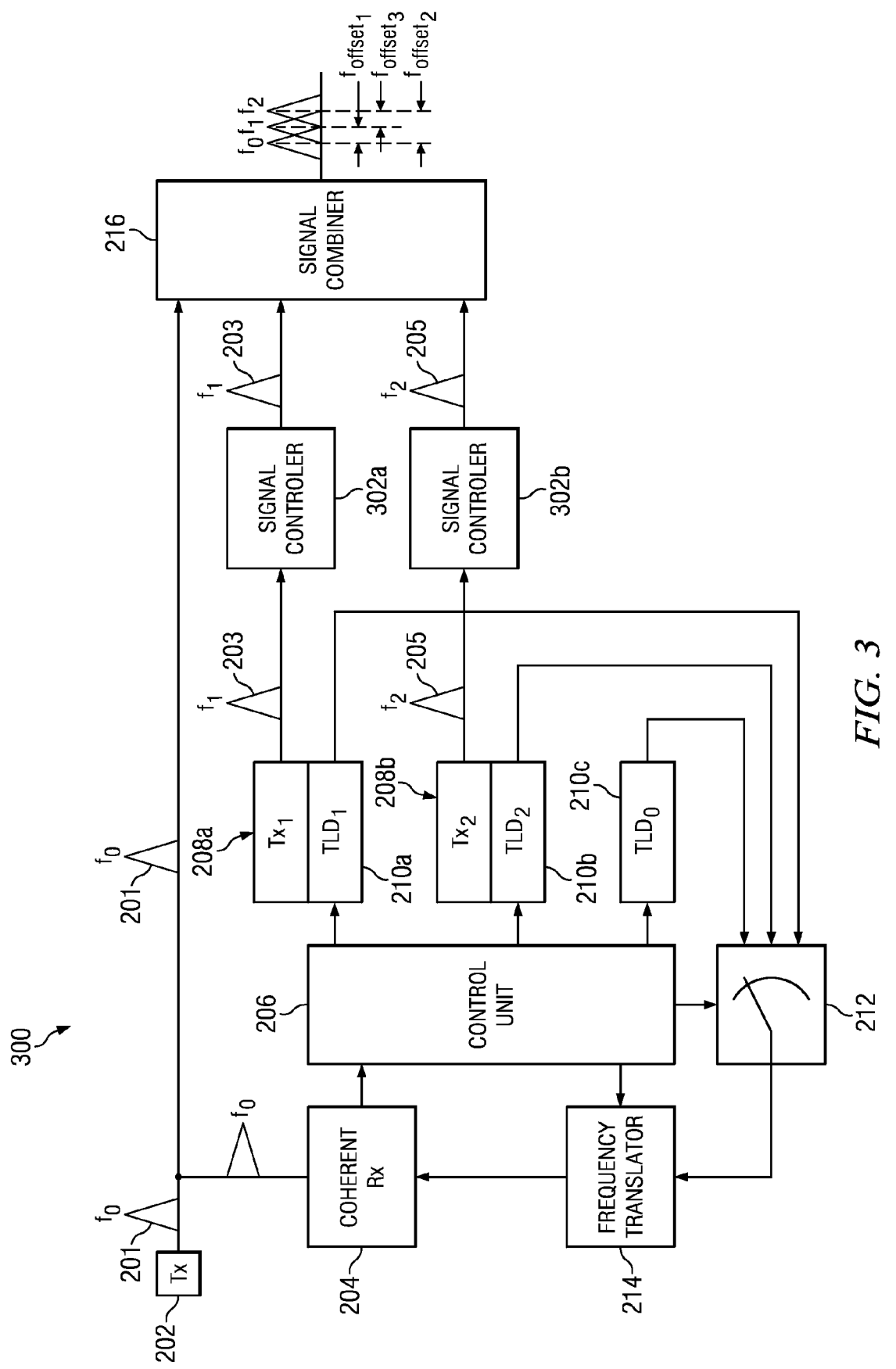
FIG. 3 illustrates another example system configured to space carrier waves based on the relative spectral distance between the carrier waves.

FIG. 3 illustrates another example system 300 configured to space carrier waves based on the relative spectral distance between the carrier waves. System 300 may be substantially similar to system 200 and accordingly may be implemented in similar components of an optical network as system 200, such as transmitting node 101 and OADM's 110 of system 100 depicted in FIG. 1.

System 300 may include reference transmitter 202 configured to transmit reference signal 201 similarly to system 200. System 300 may also similarly include tunable transmitters 208a and 208b configured to transmit optical signals 203 and 205 based at least on the relative spectral spacing between the carrier waves of signals 203 and 205, and the reference wave of signal 201. Additionally, system 300 may include coherent receiver 204, control unit 206, switch 212, frequency translator 214 and signal combiner 216, which may all be substantially similar to those described with respect to system 200 of FIG. 2. However, system 300 may also include signal controllers 302a and 302b.

Signal controllers 302a and 302b may be respectively coupled between transmitters 208a and 208b and signal combiner 216. Signal controllers 302a and 302b may comprise any suitable system, apparatus, or device configured to respectively adjust optical signals 203 and 205 according to signals being transmitted within the optical network on the fiber where optical signals 203 and 205 may be added. Adjusting the signals to be added (e.g., signals 203 and 205) according to the signals already being transmitted (e.g., reference signal 201) may reduce undesirable effects such as crosstalk between signals.

For example, signal controller 302a may be configured to adjust the phase of the carrier wave of signal 203 such that the traffic modulated onto the carrier wave of signal 203 may be substantially bit synchronized with the traffic already being transmitted within the optical network on the same fiber (e.g., the traffic of signal 203 may be bit synchronized with the traffic of reference signal 201). Additionally, signal controller 302a may be configured to adjust the polarization of signal 203 such that the polarization of signal 203 is aligned with the polarization of the signals being transmitted within the optical network on the same fiber (e.g., the polarization of signal 203 may be aligned with the polarization of reference signal 201). Signal controller 302b may be configured to perform similar operations with respect to the carrier wave of signal 205. Alternatively controllers 302 may be configured to obtain half-bit offset interleaving and/or polarization interleaving. Controllers 302 may also be configured for predetermined variation in phase or polarization state, or scrambling.

Accordingly, system 300 may also be configured to reduce undesirable interactions and effects such as crosstalk between reference signal 201, optical signal 203 and optical signal 205. Further, system 300 may include a polarization state analyzer and an additional signal controller of signal 201 to align the polarization and/or phase of the carrier wave of signal 201. A controller (not shown) may control signal controllers 302 to obtain a desired phase and or polarization state relation between two or more carrier waves of signals 201, 203, and 205. Alternatively the control unit 206 may control the signal controllers 302.

Modifications, additions and omissions may be made to system 300 without departing from the scope of the present disclosure. For example, the various embodiments and modifications described with respect to system 200 may also be done with respect to system 300. Further, although separate signal controllers 302a and 302b are depicted, the functionality of signal controllers 302a and 302b may be found in a single signal controller.

Figure 4:
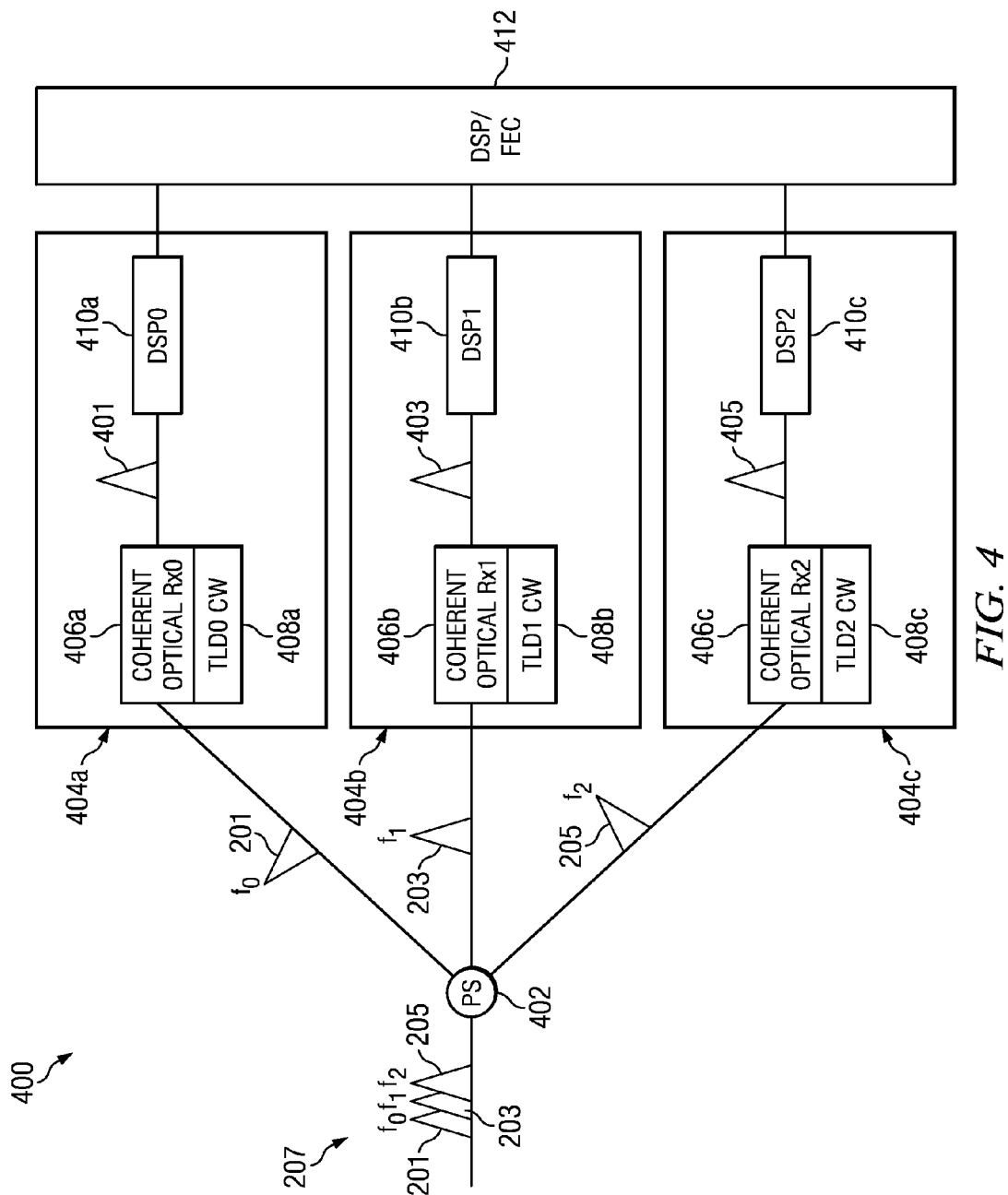
FIG. 4 illustrates an example system configured to receive a signal having carrier waves spectrally spaced apart based on the relative spectral distance between the carrier waves.

FIG. 4 illustrates an example system 400 configured to receive a signal having carrier waves spectrally spaced apart based on the relative spectral distance between the carrier waves. System 400 may be included in any node of an optical network where traffic may be received or dropped. For example, system 400 may be included in a receiving node of an optical network, such as receiving node 111 of optical network 100, or system 400 may be included in an OADM of an optical network, such as one or more OADM's 110 of optical network 100.

In the present embodiment, system 400 may be configured to receive signal 207, which is described with respect to systems 200 and 300 of FIGS. 2 and 3. As described above, signal 207 may include signals 201, 203, and 205 where signal 201 may include a carrier wave that acts as a reference wave for the frequency of the carrier waves of signals 203 and 205. System 400 may include a power splitter (PS) 402, receivers 404 and a digital signal processing unit 412.

Power splitter 402 may be configured to receive signal 207 and split signal 207 into copies of signal 207 that at a minimum include the respective signals of signal 207 (e.g., signals 201, 203 and 205). Splitter 402 may comprise any suitable system, apparatus or device configured to split a multi-frequency signal (e.g., a WDM signal) into partial copies including at least respective carrier wavelengths of the signal. In some embodiments, splitter 402 may comprise a demultiplexer such as demultiplexer 105 of receiving node 111 of system 100.

Receivers 404 may comprise any suitable system, apparatus or device configured to receive a particular carrier wave and extract the information modulated thereon. In embodiments where system 400 is implemented with respect to receiving node 111, receivers 112 of receiving node 111 may comprise receivers 404. Receivers 404 may each be associated with a carrier wave of signal 207 and may each be coupled to splitter 402 such that they each receive their respective carrier wave. For example, receiver 404a may be associated with the carrier wave of reference signal 201 and coupled to splitter 402 such that receiver 404a may receive reference signal 201. Receivers 404b and 404c may be similarly associated with the carrier waves of signals 203 and 205 respectively and coupled to splitter 402 accordingly.

Each receiver 404 may include a coherent optical receiver 406 configured to receive the carrier wave associated with its receiver 404. Each receiver 404 may also include a tunable laser 408 (e.g., a tunable laser diode (TLD)) acting as a local oscillator for the coherent receiver 406 of the receiver 404. Additionally, each tunable laser 408 may be tuned to the frequency of the carrier wave received by its associated receiver 404. Accordingly, each coherent receiver 406 may be configured to receive an optical signal carrying traffic at a particular frequency (e.g., a carrier wave) and convert that signal into an electrical signal carrying the traffic.

For example, receiver 404a may include coherent receiver 406a configured to receive signal 201. Additionally, tunable laser 408a (TLD0) may be tuned to the frequency of the carrier wave of signal 201 (e.g., $f_0$) such that coherent receiver 406a may be tuned to receive signal 201. Accordingly, coherent receiver 406a may be configured to receive signal 201, extract the traffic from signal 201 and modulate the traffic onto an electrical signal 401. Coherent receivers 406a and 406b and tunable lasers 408b and 408c may be configured to perform similar operations with respect to signals 203 and 205, and electrical signals 403 and 405 respectively. Electrical signal 401 may also be a multitude of separate electrical signals obtained from the coherent receiver.

Each receiver 404 may also include an individual digital signal processing (DSP) unit 410 coupled to the coherent receiver 406 of its associated receiver 404. Each DSP unit 410 may be configured to receive the electrical signal from its respective coherent receiver 406. Each DSP unit 410 may contain an analog to digital conversion unit configured to convert the electrical signals received from coherent receivers 406 into a digital signal. Each DSP unit 410 may also be configured to apply digital signal processing to compensate for signal distortion that the optical signal received at its associated receiver 404. The distortion may be due to effects such as cross talk, cross phase modulation, dispersion and PMD. These distortions may be linear and/or nonlinear. Each DSP unit 410 may also be configured to compensate for detuning of the tunable laser 408 of its associated receiver 404.

For example, DSP unit 410a may be configured to receive electrical signals associated with optical signal 201 from coherent receiver 406a. DSP unit 410a may compensate for any signal distortion experienced by signal 201. Additionally, DSP unit 410a may be configured to compensate for detuning of tunable laser 408a. Additionally, DSP 410a may be configured to output information related to the properties of the received signal which may be used to improve performance of the system.

System 400 may also include a DSP unit 412 coupled to each DSP unit 410 via each receiver 404. DSP unit 412 may be configured to receive electrical signals from each DSP unit 410 after each DSP unit 410 has compensated for certain optical signal distortion. DSP unit 412 may be configured to further process the traffic modulated onto the electrical signals and associated with optical signals 201, 203, and 205 to remove any impairments due to cross talk between optical signals 201, 203, and 205. As part of the signal processing, DSP unit 412 may also be configured to execute a maximum likelihood estimation routine that considers multiple bits at once, or any other suitable error correction method (e.g., forward error correction (FEC)). DSP unit 412 may also be configured to align electrical signals 401, 403 and 405 in time to a substantially similar alignment as that of optical signals 201, 203, and 205, respectively, in the optical fiber link before reaching splitter 402.

Accordingly, system 400 may be configured to receive a WDM signal with the frequencies of the carrier waves of the WDM signal relatively spaced based off of the frequency of one or more reference waves.

Modifications, additions or omissions may be made to system 400 without departing from scope of the present disclosure. For example, although system 400 is explicitly described with respect to a WDM signal having three carrier waves, system 400 may be implemented with respect to WDM signals having more or fewer carrier waves. Additionally, although a specific number of DSP units have been depicted, system 400 may include more or fewer DSP units configured to perform the operations described herein.

Figure 5:
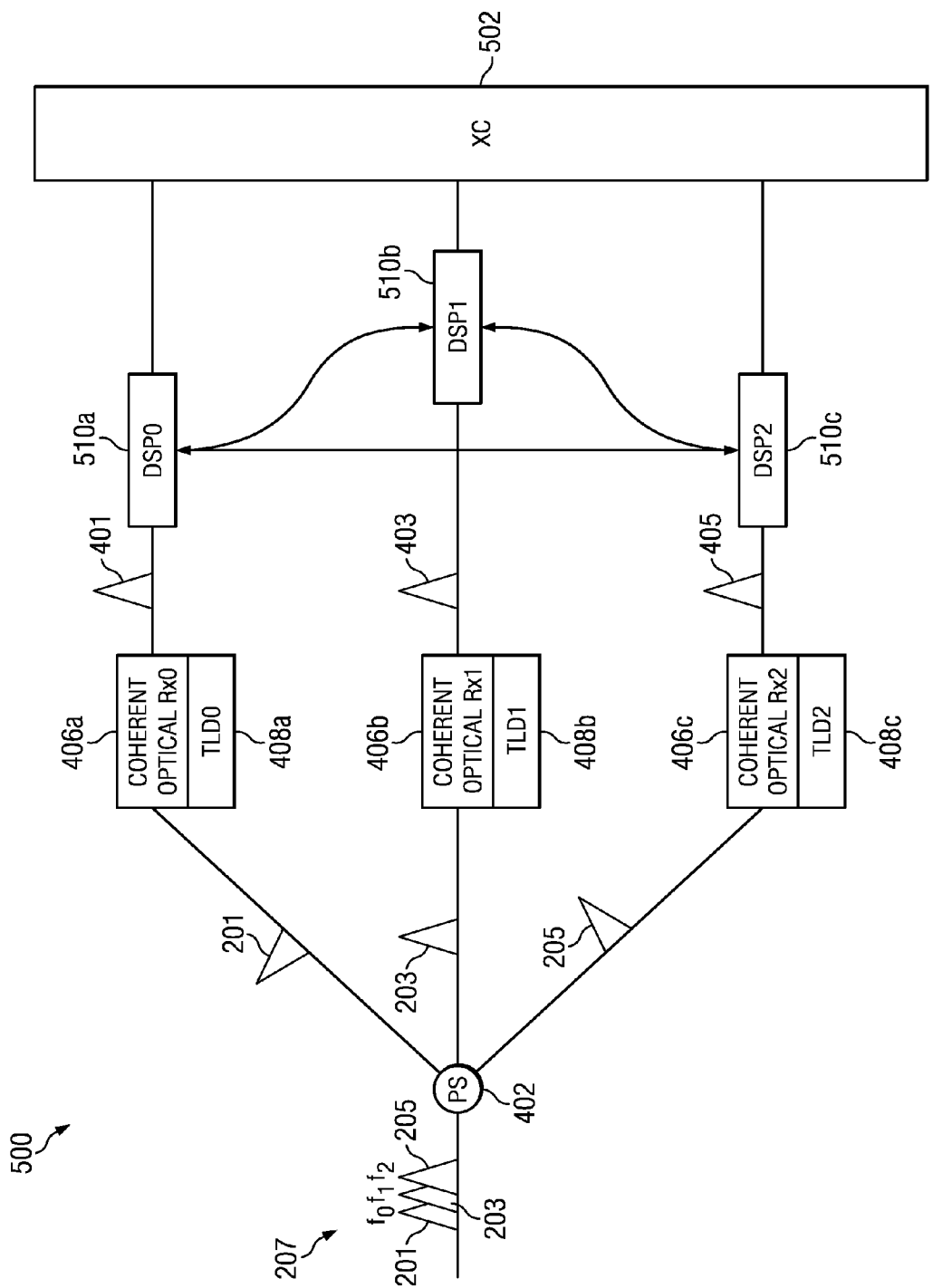
FIG. 5 illustrates another embodiment of an example system configured to receive a signal having carrier waves spectrally spaced apart based on the relative spectral distance between the carrier waves.

FIG. 5 illustrates another embodiment of an example system 500 configured to receive a signal having carrier waves spectrally spaced apart based on the relative spectral distance between the carrier waves. System 500 may be similar to system 400 and may similarly include power splitter 402 configured to split signal 207 into signals 201, 203 and 205. Additionally, system 500 may similarly include coherent receivers 406a-406c configured to respectively convert optical signals 201, 203, and 205 and the traffic modulated thereon into electrical signals 401, 403, and 405. System 500 may also include DSP units 510a, 510b, and 510c configured to perform similar signal distortion correction operations with respect to electrical signals 401, 403 and 405 as DSP units 410a, 410b, and 410c described in FIG. 4.

However, unlike in FIG. 4, DSP units 510a, 510b and 510c may be coupled to each other. Consequently, DSP units 510a, 510b, and 510c may be configured to jointly compensate for the signal distortions including distortions due to cross-talk between optical signals 201, 203 and 205 that may be made manifest in electrical signals 401, 403 and 405. Additionally, DSP units 510a, 510b, and 510c may be configured to jointly perform the operations performed by DSP unit 412 in system 400 of FIG. 4, thus obviating the need for a similar DSP unit in system 500. DSP units 510 may be jointly interconnected using any suitable method, to one or more other DSP unit to realize for example a butterfly network digital signal processing configuration.

System 500 may also include circuitry 502 coupled to DSP units 510. Circuitry 502 may be configured to receive the information associated with waves 201, 203, and 205, and electrical signals 401, 403, and 405. Circuitry 502 may comprise a cross-connect (xC) and may be configured to perform operations including switching and/or rearranging information signals 401, 403 and 405.

Modifications, additions or omissions may be made to system 500 without departing from the scope of the present embodiment. For example, WDM signal 207 may include more or fewer carrier waves than those described and system 500 may be configured to process more or fewer carrier waves accordingly.

Figure 6:
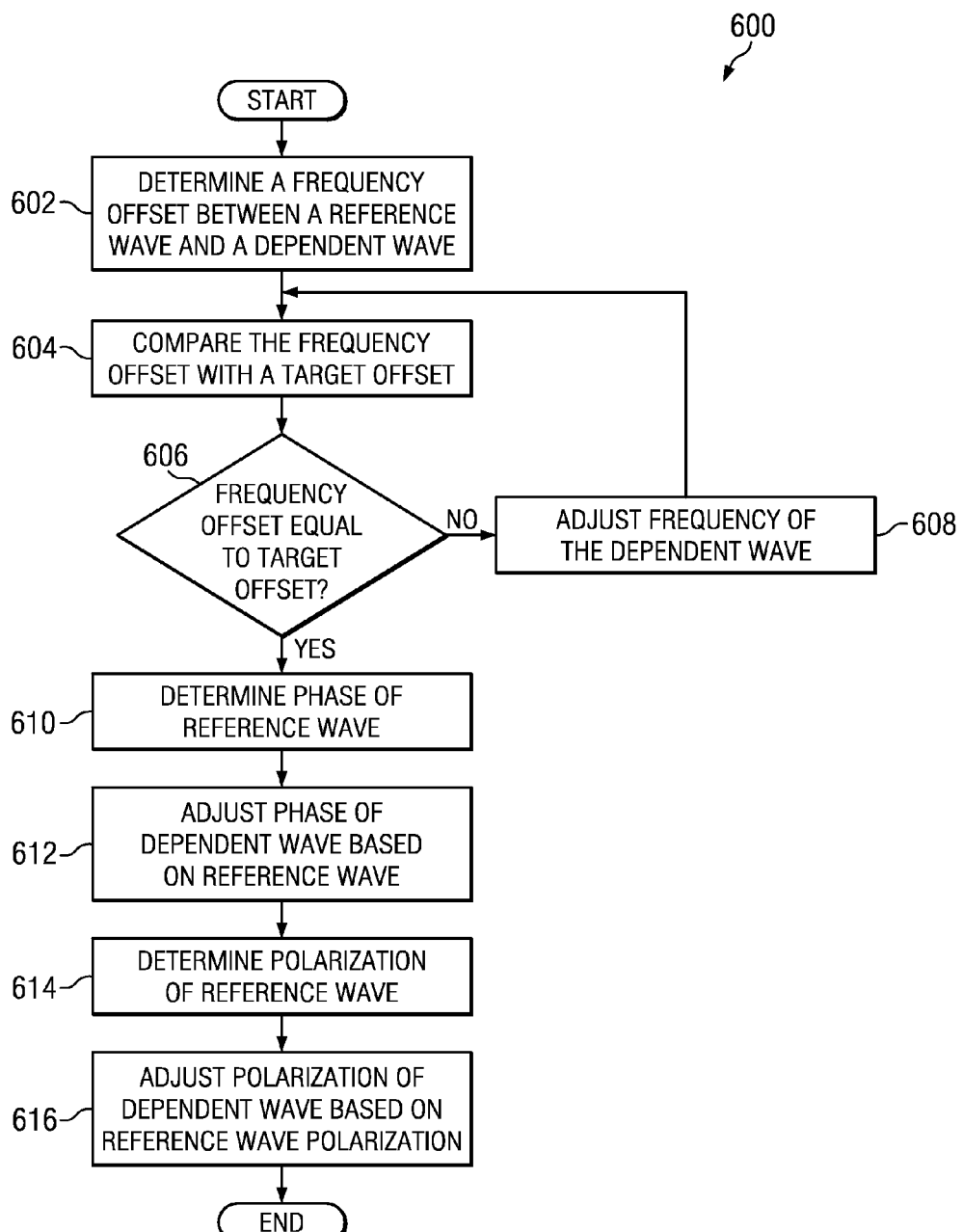
FIG. 6 illustrates an example method for spacing carrier waves based on the relative spectral distance between the carrier waves.

FIG. 6 illustrates and example method 600 for spacing carrier waves based on the relative spectral distance between the carrier waves. One or more steps of method 600 may be performed by or within one or more components of systems 100, 200 and 300 described previously with respect to FIGS. 1, 2 and 3.

In certain embodiments, method 600 may be implemented partially or fully in software, firmware, or other logic embodied in tangible computer readable media. As used in this disclosure, "tangible computer readable media" means any instrumentality, or aggregation of instrumentalities that may retain data and/or instructions for a period of time. Tangible computer readable media may include, without limitation, random access memory (RAM), read-only memory (ROM), electrically erasable programmable read-only memory (EEPROM), a PCMCIA card, flash memory, direct access storage (e.g., a hard disk drive or floppy disk), sequential access storage (e.g., a tape disk drive), compact disk, CD-ROM, DVD, and/or any suitable selection of volatile and/or non-volatile memory and/or a physical or virtual storage resource.

Method 600 may start at step 602 where a coherent receiver (e.g., coherent receiver 204) may determine a frequency offset between a reference carrier wave (e.g., the carrier wave of reference signal 201) and a dependent carrier wave (e.g., the carrier wave of signal 203). The term "dependent carrier wave" may be used to denote a carrier wave whose frequency is determined by a relative spectral offset from another carrier wave acting as a reference carrier wave.

At step 604, a control unit or any other suitable system, apparatus, or device (e.g., control unit 206) may compare the frequency offset determined by the coherent receiver with a desired target frequency offset. At step 606, the control unit may determine whether the frequency offset is approximately equal to the desired target offset. If the frequency offset is approximately equal to the desired target offset, method 600 may proceed to step 610, otherwise, method 600 may proceed to step 608.

At step 608, the control unit may adjust the frequency of the dependent wave based on the difference between the target frequency offset and the measured frequency offset. The control unit may adjust the frequency of the dependent wave by adjusting a tunable laser of a tunable transmitter configured to transmit the dependent carrier wave (e.g., control unit 206 may adjust tunable laser 210a of tunable transmitter 208a). Following step 608, method 600 may return to step 604 and compare the frequency offset with the target offset to determine whether the frequency adjustment in step 608 was sufficient such that the determined offset is approximately equal to the target offset.

At step 610, after it is determined that the frequency offset is sufficiently equal to the target offset, a signal controller (e.g., signal controller 302a or 302b of FIG. 3) may determine the phase of the reference wave. At step 612, the signal controller may adjust the phase of the dependent wave based on the phase of the reference wave such that the dependent wave and reference wave are sufficiently in phase with each other.

At step 614, the signal controller may also determine the polarization of the reference wave and at step 616 the signal controller may adjust the polarization of the dependent wave based on the polarization of the reference wave such that the polarizations of the reference wave and the dependent wave are sufficiently equal to each other. Following step 616, method 600 may end.

Modifications, additions or omissions may be made to method 600 without departing from the scope of the present disclosure. For example, a frequency translator, such as frequency translator 214 of FIGS. 2 and 3 may be used to perform an additional step of shifting the frequency of the dependent wave before the dependent wave is received by the coherent receiver to determine the frequency offset. Additionally, in some embodiments steps 610-616 may be omitted. Further, in other embodiments steps 610-616 may be performed in an alternate order than that described. Additionally, the target offsets in frequency, phase, and polarization may be defined at any suitable reference point in the system and include a desired fixed target value. Alternatively one or more of said desired fixed target values may be varying in time in a predetermined manner.

Although the present disclosure and its advantages have been described in detail, it should be understood that various changes, substitutions and alterations can be made herein without departing from the spirit and scope of the disclosure as defined by the following claims.

What is claimed is:

1. A system comprising: a coherent optical receiver configured to determine a frequency offset between a first frequency of a first optical carrier wave and a second frequency of a second optical carrier wave, wherein the first optical carrier wave is modulated with first information to form a first optical signal and the coherent optical receiver is configured to demodulate the first information associated with the first optical signal;

a tunable optical transmitter comprising a tunable laser configured to generate the second optical carrier wave at the second frequency and coupled to the coherent optical receiver such that the coherent optical receiver receives the second optical carrier wave from the tunable laser;

a control unit coupled to the coherent optical receiver and the tunable optical transmitter and configured to receive the frequency offset from the coherent optical receiver and adjust the second frequency of the tunable laser according to the frequency offset; and a signal combiner circuit coupled to the tunable optical transmitter and configured to combine the first optical signal with a second optical signal generated by the tunable optical transmitter by modulating second information on the second optical carrier wave.

2. The system of claim 1, wherein the control unit is further configured to compare a target offset with the frequency offset received from the coherent optical receiver and adjust the second frequency such that the determined frequency offset is substantially equal to the target offset.

3. The system of claim 1, further comprising a frequency translator coupled between the coherent optical receiver and the tunable laser, the frequency translator configured to shift the second frequency of the second optical carrier wave before the second optical carrier wave is received by the coherent optical receiver from the tunable laser.

4. The system of claim 3, wherein the control unit is further configured to adjust the second frequency such that the determined frequency offset combined with the shift in the second frequency is substantially equal to the target offset.

5. The system of claim 3, further comprising:
a plurality of tunable optical transmitter s each comprising a tunable laser configured to generate an optical carrier wave; and
an optical switch coupled between the plurality of tunable lasers and the coherent optical receiver, the optical switch configured to select one of the plurality of tunable lasers to provide the second optical carrier wave to the coherent optical receiver.

6. The system of claim 1, further comprising a frequency comb generator coupled between the coherent optical receiver and the tunable laser, the frequency comb generator configured to receive the second optical carrier wave from the tunable laser and create a number of distinct frequencies from the second optical carrier wave before the second optical carrier wave is received by the coherent optical receiver.

7. The system of claim 1, wherein the signal combiner circuit includes a wavelength selective switch (WSS).

8. The system of claim 1, wherein the first optical signal has a first phase and the second optical signal has a second phase, the system further comprising a signal controller coupled between the tunable optical transmitter and the signal combiner circuit and configured to adjust the second phase according to the first phase.

9. The system of claim 1, wherein the first optical signal has a first polarization and the second optical signal has a second polarization, the system further comprising a signal controller coupled between the tunable optical transmitter and the signal combiner circuit and configured to adjust the second polarization according to the first polarization.

10. A method for spectrally spacing carrier waves comprising: receiving a first optical signal comprising a first optical carrier wave modulated with first information;
demodulating the first information associated with the first optical signal;
determining a frequency offset between a first frequency of the first optical carrier wave and a second frequency of a second optical carrier wave;
adjusting the second frequency according to the frequency offset; and
combining the first optical signal and a second optical signal into a multi-frequency signal, the second optical signal comprising the second optical carrier wave modulated with second information.

11. The method of claim 10, further comprising:
comparing a target frequency offset with the frequency offset; and
adjusting the second frequency such that the determined frequency offset is substantially equal to the target frequency offset.

12. The method of claim 10, further comprising shifting the second frequency before determining the frequency offset.

13. The method of claim 12, further comprising adjusting the second frequency such that the determined frequency offset combined with the shift in the second frequency is substantially equal to the target offset.

14. The method of claim 10, further comprising optically selecting one out of a multitude of tunable lasers to source the second optical carrier wave.

15. The method of claim 10, further comprising adjusting a second polarization of the second optical carrier wave according to a first polarization of the first optical carrier wave.

16. The method of claim 10, further comprising adjusting a second phase of the second optical carrier wave according to a first phase of the first optical carrier wave.

* * * * *